(12) United States Patent
Moses

(10) Patent No.: US 10,581,618 B2
(45) Date of Patent: Mar. 3, 2020

(54) SYSTEM, METHOD AND APPARATUS FOR PROVIDING ENROLLMENT OF DEVICES IN A NETWORK

(71) Applicant: Entrust, Inc., Dallas, TX (US)

(72) Inventor: Timothy Edward Moses, Ottawa (CA)

(73) Assignee: Entrust, Inc., Dallas, TX (US)

( * ) Notice: Subject to any disclaimer, the term of this patent is extended or adjusted under 35 U.S.C. 154(b) by 0 days.

(21) Appl. No.: 14/795,081

(22) Filed: Jul. 9, 2015

(65) Prior Publication Data
US 2016/0013948 A1   Jan. 14, 2016

Related U.S. Application Data

(60) Provisional application No. 62/023,262, filed on Jul. 11, 2014.

(51) Int. Cl.
*H04L 29/06* (2006.01)
*H04L 9/32* (2006.01)

(52) U.S. Cl.
CPC ........ *H04L 9/3268* (2013.01); *H04L 63/0442* (2013.01); *H04L 63/0823* (2013.01)

(58) Field of Classification Search
CPC ... H04L 9/3268; H04L 41/28; H04L 63/0442; H04L 63/0492; H04L 63/065; H04L 63/0823; H04L 63/0853
See application file for complete search history.

(56) References Cited

U.S. PATENT DOCUMENTS

| | | | | |
|---|---|---|---|---|
| 8,266,424 | B2* | 9/2012 | Negahdar | H04L 63/062 713/155 |
| 2002/0172190 | A1* | 11/2002 | Vatanen | H04W 12/10 370/352 |
| 2004/0107366 | A1 | 6/2004 | Balfanz et al. | |
| 2005/0144144 | A1* | 6/2005 | Graff | G06F 21/33 705/76 |
| 2006/0150241 | A1* | 7/2006 | Huh | H04L 9/32 726/4 |
| 2009/0063849 | A1* | 3/2009 | Doyle | H04L 29/12839 713/151 |

(Continued)

OTHER PUBLICATIONS

European Patent Office; International Search Report and Written Opinion; International Application No. PCT/US2015/039693; dated Oct. 15, 2015.

*Primary Examiner* — Ghodrat Jamshidi
(74) *Attorney, Agent, or Firm* — Faegre Baker Daniels LLP

(57) ABSTRACT

In one example, an enrollment device, such as a smart phone with an enrollment application executing thereon, obtains in situ enrollment information from at least one or more target device of a plurality of target devices in a network. The enrollment device provides the in situ enrollment information that is obtained from the at least one target device, to a security management device, such as a public key certificate generator (e.g., a certification authority) for the network, to facilitate target device configuration certificate generation for the at least one target device. The security management device uses the in situ enrollment information and other device specific information as well as operational information that is desired for a device, and issues a configuration certificate for the at least one target device. A system and methods are also set forth.

10 Claims, 5 Drawing Sheets

(56) References Cited

U.S. PATENT DOCUMENTS

| | | | |
|---|---|---|---|
| 2009/0125718 A1* | 5/2009 | Chu | G06F 21/10 |
| | | | 713/168 |
| 2010/0325654 A1* | 12/2010 | Moroney | H04L 12/281 |
| | | | 725/30 |
| 2011/0029771 A1* | 2/2011 | Mehta | H04L 63/0823 |
| | | | 713/156 |
| 2013/0318343 A1* | 11/2013 | Bjarnason | H04L 41/0809 |
| | | | 713/157 |
| 2014/0053281 A1* | 2/2014 | Benoit | H04L 12/2809 |
| | | | 726/29 |
| 2014/0181521 A1 | 6/2014 | Hemphill et al. | |
| 2014/0278281 A1* | 9/2014 | Vaynriber | G06F 17/5004 |
| | | | 703/1 |
| 2014/0358257 A1* | 12/2014 | Fries | G05B 19/0426 |
| | | | 700/86 |
| 2015/0381416 A1* | 12/2015 | Ramfelt | H04W 4/001 |
| | | | 455/435.1 |
| 2016/0373431 A1* | 12/2016 | Van Den Broeck | |
| | | | H04L 63/083 |

\* cited by examiner

SYSTEM, METHOD AND APPARATUS FOR PROVIDING ENROLLMENT OF DEVICES IN A NETWORK

RELATED APPLICATIONS

This application claims priority to Provisional Application Ser. No. 62/023,262, filed on Jul. 11, 2014, having inventor Timothy Edward Moses, titled "METHOD AND APPARATUS FOR PROVIDING ENROLLMENT OF DEVICES IN A NETWORK," and is incorporated herein by reference.

BACKGROUND OF THE DISCLOSURE

The disclosure relates to methods and apparatus for enrolling devices in networks.

In proposed models for providing security for the Internet of Things, there are two proposed authentication infrastructures, either or both of which may use public key infrastructure (PKI) technology and certificates. For example, when connecting multiple devices to a network (or to each other), via the Internet, a first security infrastructure may install credentials in the devices that uniquely identify each device. These identification credentials may be unmanaged from a security perspective and are independent of the domain of use. For example, when a device that can be connected to a network is manufactured, such as temperature sensors and thermostats to be installed in multiple floors of a large building, the manufacturer may have a server or use a server of a third party as a root certificate server and generate identification certificates for each of the devices that are produced by the manufacturer. As such, during manufacture, a database may be created with an entry correlating a unique identifier of the device with a certificate that is signed by the root certificate authority. In this manner, when a device is turned on, it may authenticate via a network, to the root authority or to another certification authority.

However, a different security infrastructure may be used for managing the configuration of the device when it is installed. As such, generic devices need to be added as new devices in a system or network and then the device needs to be configured to operate in a particular manner consistent with the needs of the system or network. For example, another authorization infrastructure may be used for managing authorization such as which devices are authorized on a network, which devices can send which commands to which interfaces of which other devices in a network and their configuration settings. With a growing number of devices having to be installed in larger networks such as building networks, roadside infrastructures, manufacturing facilities, and other environments, each device has to be enrolled in a database of the second infrastructure. Currently, this can be a cost prohibitive and time consuming process.

For example, referring to FIG. 1, a system 100 is shown with a plurality of devices 102 and 102n, that are to be added in a network, such as a network that employs the Internet 104. The devices may be sensors, actuators, roadside infrastructure elements, or any other suitable device that can network with the Internet or other network. Enrolling the devices 102-102n may be typically done in a batch process at a central location and then shipped to be installed. An administrator would need to review a plan of an overall system and try to figure out how to configure the devices.

In this example, a security management device 106 that is part of a security management infrastructure, in this case a PKI infrastructure, populates a database 108, through an administrator interface at a server or other computer as part of the device 106, with data needed to issue device configuration certificates that are then issued to the devices 102-102n to configure the devices to operate as required by the network. Each device has a suitable network interface to communicate with the network and in this example, includes an IP address or URL. In one example, the security management device 106 may generate device configuration certificates in a capability certificate model shown as certificate 110 and/or device configuration certificates based on a device permission certificate model, shown as certificate 112. The device configuration certificates may be stored in a certificate database 114 as known in the art. An example of a device configuration certificate based on a capability certificate model would be a certificate, for example, signed by the security management device 106 or other suitable certification authority. The device configuration certificate that is based on a device capability certificate would include, for example, the device ID, such as a serial number, IP address URL or other identifier, as well as data representing the commands the particular device can emit. A device configuration certificate that is based on a device permission certificate 112 through a permission model may generate a certificate that includes the same type of device ID information and data identifying what commands a device can accept. The database 108 may include, for example, the device ID for each device in the network and a per device location such as the position of the device within the system. For example if the device is a sensor in a one of many pipes, its position within a particular pipe with respect to a particular junction of pipes or other location information has to be determined by an administrator. The database 108 may also include other device information such as the model number and serial number of the device as well as capabilities of the device set by an administrator that may set the parameters through a suitable user interface of the security management device 106. Alternatively, permissions or rules may be stored for a particular set of devices if a permission model is used. The issued device configuration certificates, whether they be based on a capability model or permission model, after generated or issued, are then sent to each respective device so that their configuration is securely administered through a public key infrastructure based security system. As such, a device 102-102n, will only accept a certificate if it can verify that it was signed by a trusted root authority, and changes can only be made to the configuration of the device via the security management device 106.

A problem arises when a large number of devices are employed in a network and are the same or different types of devices so that an administrator of the system needs to manage individual device capabilities and/or permissions according to the function it performs in the overall system. Also, if the user gets the location information from an untrusted source, the network and devices may be susceptible to attack.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
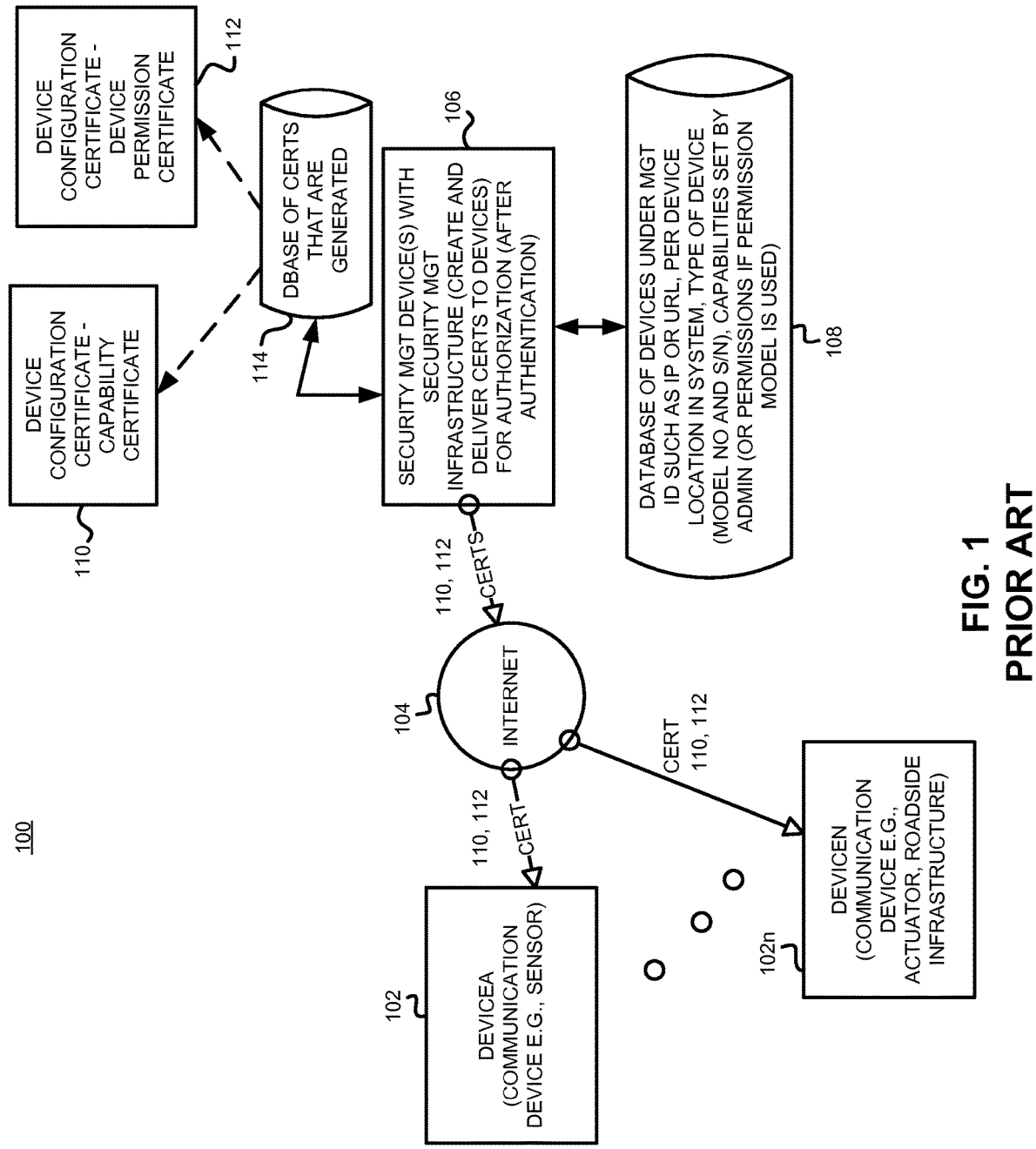
FIG. 1 is a block diagram illustrating one example of a prior art system.

Generally, an enrollment device, such as a smart phone with an enrollment application executing thereon, obtains in situ enrollment information from at least one or more target device of a plurality of target devices in a network. The enrollment device provides the in situ enrollment information that is obtained from the at least one target device, to a security management device, such as a public key certificate generator (e.g., a certification authority) for the network, to facilitate target device configuration certificate generation for the at least one target device. The security management device uses the in situ enrollment information and other device specific information as well as operational information that is desired for a device, and issues a configuration certificate for the at least one target device. The security management device may be part of a security infrastructure and the security management device utilizes a database of devices under management to obtain data about a target device, such as where the target device is physically located, what real world function it is intended to perform, its location within the network topology, and/or type of device it is, and any other suitable information about a particular device as obtained by the in situ enrollment device.

The enrollment device registers the enrollment information at the time of installation of the target device in a network. The in situ enrollment device may be any suitable device and need not operate in a real time connection to the security management device and an authorization infrastructure. This may include, for example, the smart phone obtaining a photograph of the target device, and/or RFID tag information from the target device that identifies the device, GPS coordinates of the target device if desired, a barcode reader if desired or any other suitable capture device that obtains, for example, in situ target device identification information from the target device. The device identification information may include, for example, manufacturer ID, model number, IP address, URL and/or serial number. The in situ enrollment device may also generate the date/time as event information to identify when the enrollment occurs. The in situ enrollment device may also obtain the trusted root CA public key(s) of the target devices from the target devices. This enrollment information is correlated with the enrollment event, so that the security management device can authorize the enrollment and link the target device's initial identity with the enrollment information. The target device's IP address can be obtained as a side effect of the enrollment event. The IP address may be dynamic or static. Also, the target device may include a URL associated therewith.

The security management device may populate the target device management database 108 with a target device's capabilities (permissions) or access control list (depending upon the authorization model in use) and the capabilities or permissions may be provisioned to the target unit via a configuration certificate.

Figure 2:
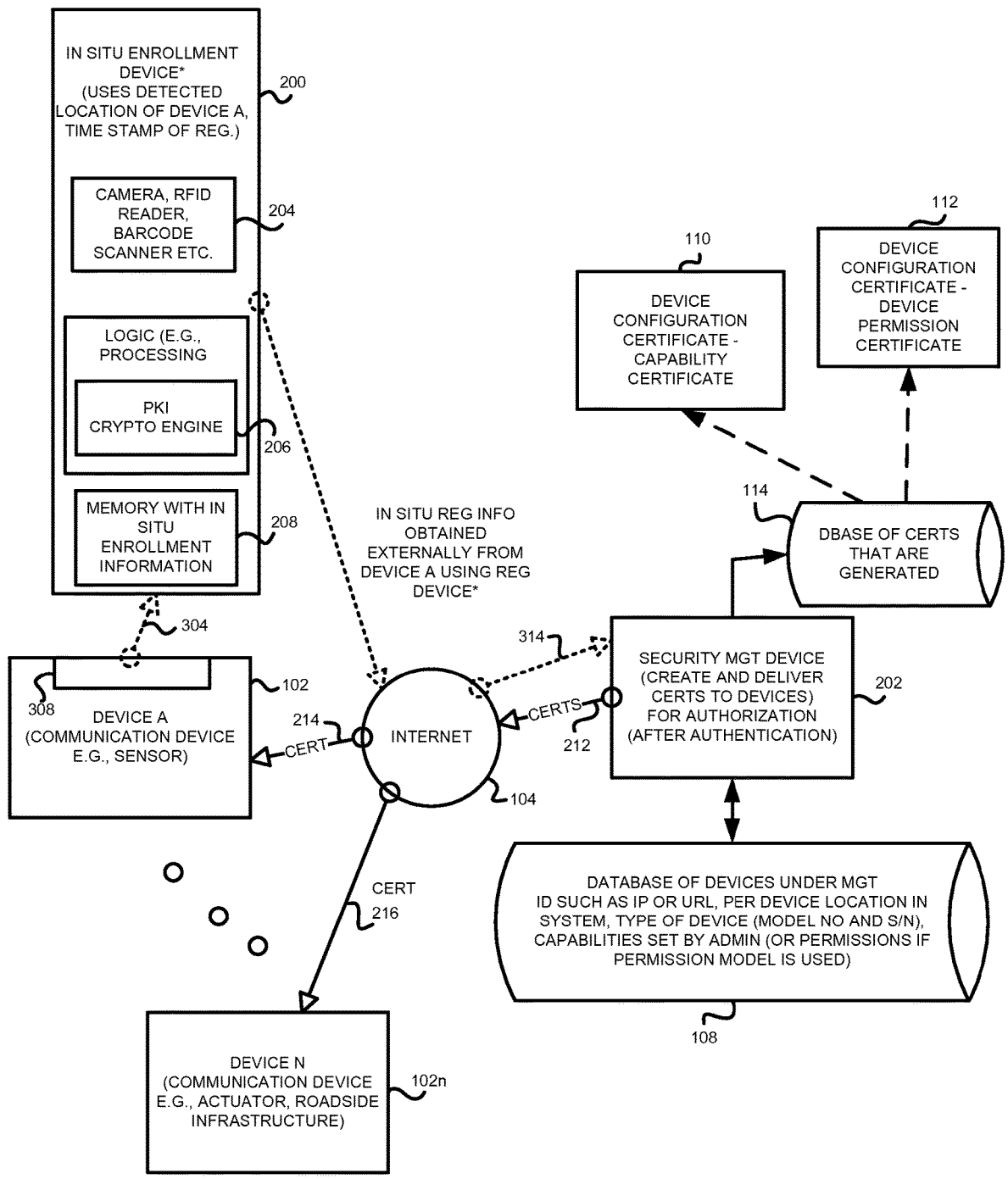
FIG. 2 is a block diagram illustrating one example of a system in accordance with one embodiment set forth in the disclosure.
Figure 3:
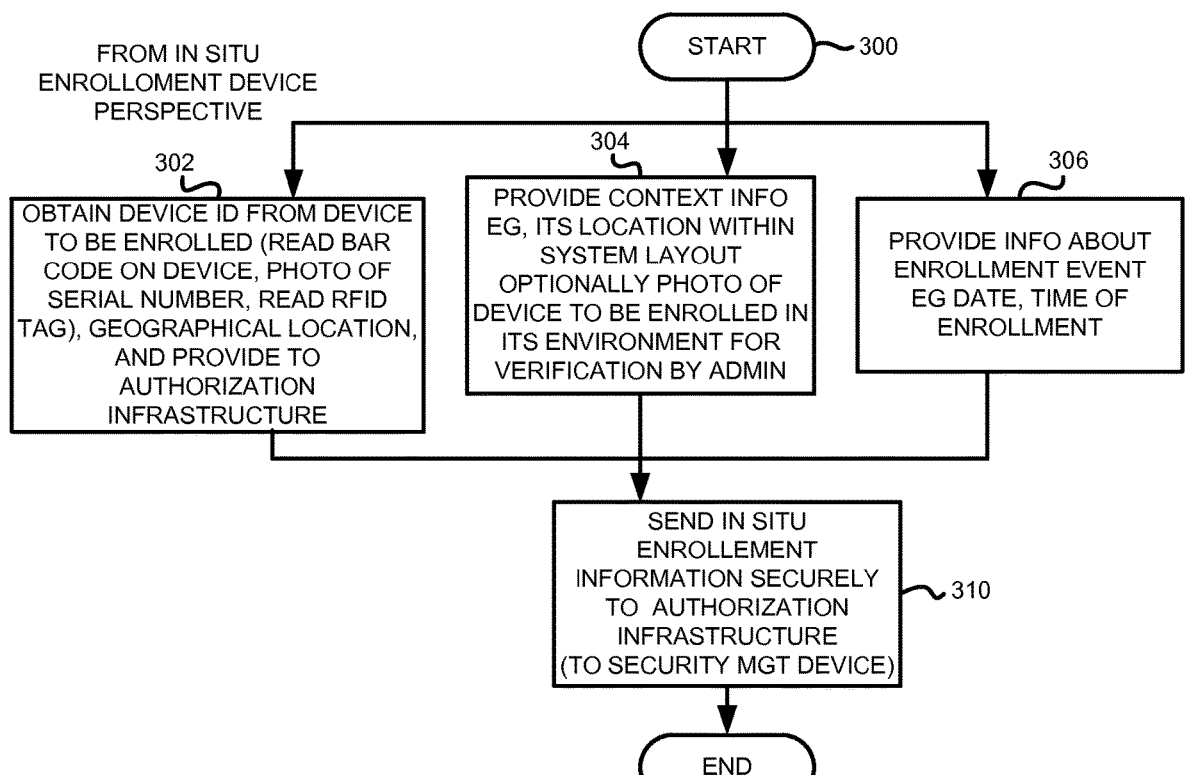
FIG. 3 is a flowchart illustrating one example of a method for enrolling a plurality of devices in a network in accordance with one embodiment of the disclosure.

Referring to FIGS. 2 and 3, a discussion of the operation of the in situ enrollment device, also referred to as the enrollment device 200 will be described. The in situ enrollment device in this example, is a smart phone that includes logic 206 that in one example includes one or more processors that executes an application to perform the operations described herein. In addition in this example, an information capture device 204, such as a camera, RFID reader, barcode scanner or other information capture device is controlled by the one or more processors 206 as described herein. The device may include a display for providing a suitable graphic user interface and providing other information as known in the art. The logic 206 may be implemented in any suitable structure including discrete logic, one or more state machines, one or more processors that execute stored instructions that when executed, cause the processor to perform the operations described herein. Memory 208 may store the application and other executable instructions. The memory 208 may include RAM, ROM or any suitable combination thereof as known in the art or any other suitable type of memory. The enrollment device creates a record for the target device management database 108 in order that the security management device 106 can generate the device configuration certificate 110 or 112 for the target device. The in situ enrollment device uniquely identifies a target device in situ based on external characteristics of the target device as obtained by the enrollment device.

The in situ enrollment device 200 may also be configured as a trusted in situ enrollment device by the security management device 202 issuing a certificate for the trusted in situ enrollment device. By way of example, the security management device may issue a private and public key pair for the in situ enrollment device to allow the in situ enrollment device to digitally sign the in situ enrollment information. Additionally, a public key certificate can be issued by the security management device for the trusted in situ enrollment device so that the trusted in situ enrollment device upon authentication with the security management device may then be considered trusted using public key techniques as known in the art. Additionally or alternatively, the in situ enrollment information may be communicated through a secure channel using, for example, SSL or TSL protocols.

As shown in FIG. 3, a method for enrolling a plurality of target devices in a network may start in block 300 by for example, activating the enrollment application or performing some other activation operation on the enrollment device 200. As shown in block 302, the method includes obtaining, by the enrollment device in this example, in situ enrollment information 304 from at least one target device 102. The in situ enrollment information 304 is obtained on site at the location of the target device 102, in this example, by using a barcode scanner to read a barcode 308 on target device 102. The barcode contains the target device identifier, such as a serial number. In addition, the enrollment device may obtain the geographical location of the target device either directly from the target device through a wireless communication link if desired, if the target device has a GPS system thereon, or may be held near the target device and use its own GPS system as a proxy if desired. As shown in block 303, the in situ enrollment information 304 may also include context information which may be, for example, the target device's location within the system layout or position within the system topology. This may be entered or selected by the user that is using the secure enrollment device to indicate, for example, that the target device is located within a certain room in a building, position in a pipe, location within a vehicle or any other suitable system topology information. Optionally, a photograph of the target device may be taken and sent by the in situ enrollment device to verify by an administrator using the security management device that the target device is in fact located in the appropriate position within a network topology if desired.

As shown in block 306, the method may include providing in situ enrollment information that includes information about the enrollment event such as a date and time of enrollment. One or more of the in situ enrollment information obtained through blocks 302, 303 and 306 may then be sent as shown in block 310 securely to the authorization infrastructure and in this example, to the security management device. This information may be formatted in the form of a database record or take any other suitable format. The provision of the in situ enrollment information 304 from the target device by the in situ enrollment device is provided to the security management device to facilitate target device configuration certificate generation for the at least one target device 102. The providing of the in situ enrollment information is shown by communication 312 and 314.

Figure 4:
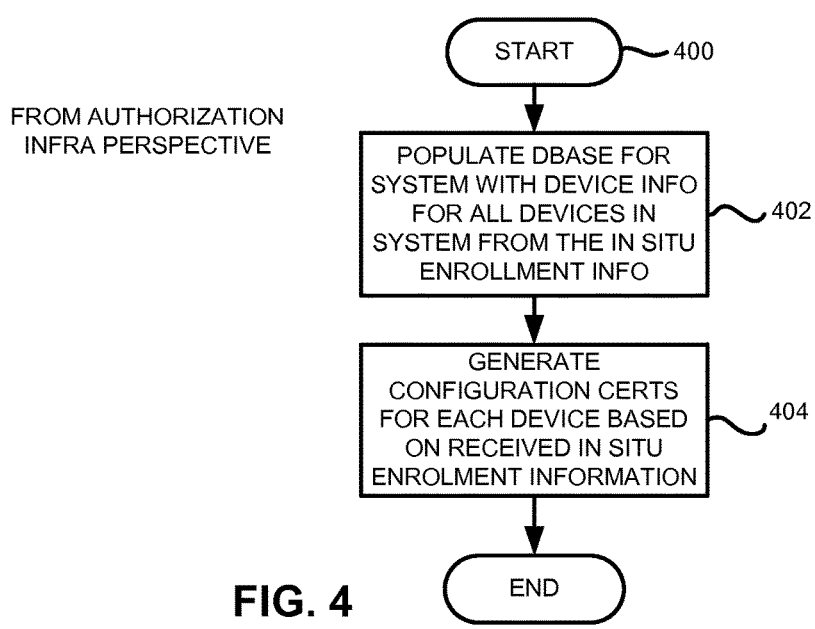
FIG. 4 is a flowchart illustrating one example of a method for generating configuration certificates for a plurality of devices in a network in accordance with one embodiment of the disclosure.

Referring to FIG. 4, the operation of the security management device 202 will now be described. The security management device 202 may be a server or any other suitable structure that includes one or more processors and associated memory such that the memory stores executable instructions that when executed by the one or more processors, cause the security management device to operate as described herein. The security management device 202 may also be, for example, a desktop computer or any other suitable device and may be part of a security management PKI infrastructure and may serve as a certificate authority that issues public key certificates as known in the art. In this example, the security management device may also issue the device configuration certificates 110 and 112 based on the in situ enrollment information 304. As such, the target device configuration certificates 110 and 112 are generated using asymmetric key based signature technique as known in the art.

As shown in block 400, a method for enrolling a plurality of target devices may include an administrator logging into the security management device 202 to set up a network of a plurality of devices 102-102n. As shown in block 402, the method may include populating the target device database 108 for the system with target device enrollment information for all devices in a system from the in situ enrollment information 304 that was obtained from each of the plurality of devices by the enrollment device. As shown in block 404, the method includes generating configuration certificates 110 and/or 112 for each target device based on the received corresponding in situ enrollment information 304 obtained from each of the various target devices in the network. For example, this may include receiving a request from the target device for the generated target device configuration certificate 110 and/or 112, retrieving the generated target device configuration certificate from the database 114 and returning the retrieved target device configuration certificate to the respective target device as shown by communications 212, 214 and 216. This may be communicated wirelessly, over wired lines or via any networks or other connections as desired.

By way of illustration, if an administrator reviews the database information showing the in situ information that a particular target device is a particular type of sensor, the administrator may then suitably assign proper capabilities for that particular device. The location of the device within the topology may also assist the administrator in determining which capabilities to include in a device configuration certificate. Having an enrollment device to obtain in situ enrollment information for a plurality of devices greatly eases the enrollment process for large installations of generic devices that are then later configured remotely through a certificate issuance process. Other advantages will be recognized by those of ordinary skill in the art.

Figure 5:
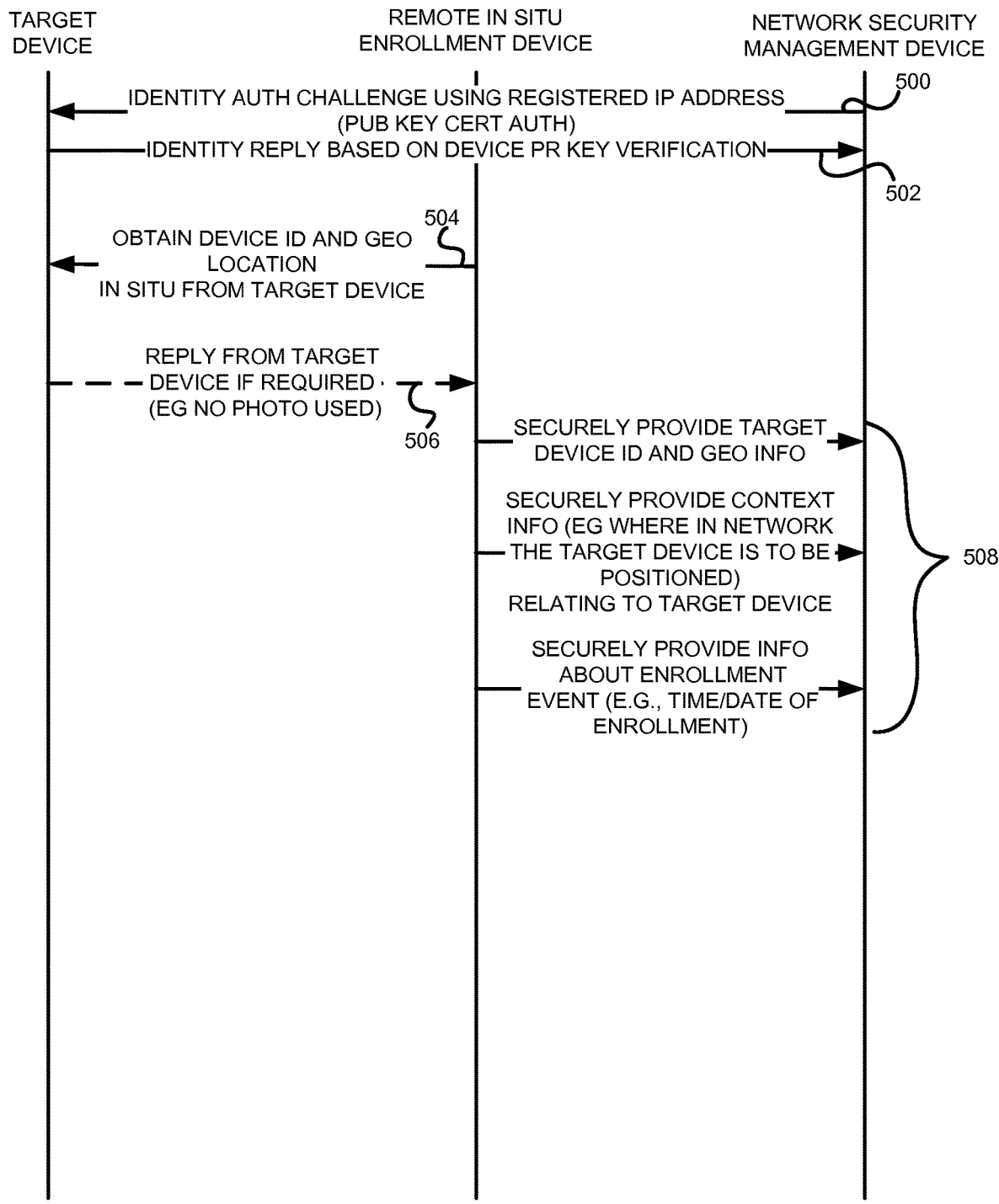
FIG. 5 is one example of a communication diagram between a target device to be enrolled, a remote in situ enrollment device and a network security management device in accordance with one embodiment set forth in the disclosure.

FIG. 5 illustrates one example of a signaling scheme that may be employed by the system 200. As shown, as an initial part of a security process, an identity authentication challenge may be issued by the network security management device to the target device by, for example, assigning a challenge, for example, using a public key associated with the target device. This is shown by communication 500. As shown in communication 502, the target device may use its private key to verify the public key challenge and indicate that the target device trusts the security management device if the key properly verifies. As shown by communication 504, the remote in situ enrollment device may then obtain in situ enrollment information such as device ID. It may also obtain other in situ enrollment information such as the geographic location from the target device and the target device will reply if obtaining the information is done, for example, by a two way communication mechanism. However, a passive approach may also be used, such as for example, taking a photo of the target device or an RFID tag read or barcode read so that the target device need not communicate using its own communication sources, with the enrollment device. This is shown in communication 506. As shown by communication 508, the remote in situ enrollment device securely provides the target device ID and any other in situ enrollment information that was obtained from the device and may provide context information and enrollment event information if desired.

Figure 6:
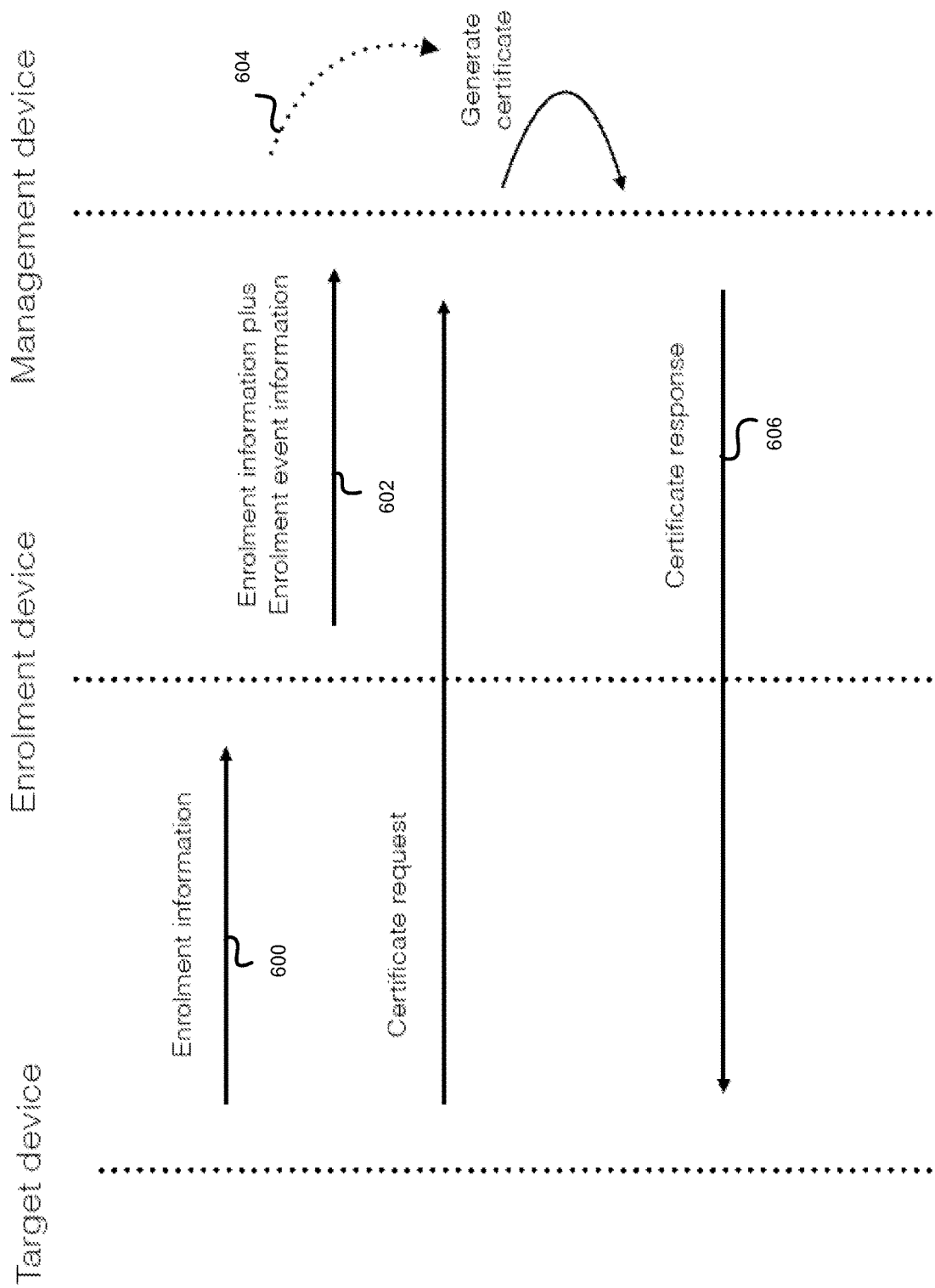
FIG. 6 is one example of a communication diagram between a target device to be enrolled, a remote in situ enrollment device and a network security management device in accordance with one embodiment set forth in the disclosure.

Referring to FIG. 6, an alternative embodiment is illustrated wherein in situ enrollment information is obtained by the enrollment device in any suitable manner as shown in communication 600. The in situ enrollment information is communicated in addition to enrollment event information as shown in block 602. As shown in dashed arrow 604, the security management device then generates the appropriate configuration certificate and then sends the configuration certificate to the target device as shown in communication 606.

As part of the initial device identification process, if desired, many options may be employed such as during manufacture, a manufacturer may create a database entry that correlates a unique identifier with an identifier that is visible to, or accessible by, the in situ device in order to facilitate enrollment in the authorization infrastructure (the infrastructure that provides the configuration certificates). The identity infrastructure can issue a corresponding set of identifiers such as serial numbers that become included in the target device's label or in an internal RFID tag. Also, following the manufacture of a target device, the manufacturer may read a unique identifier and a unit serial number and may make a list available to the identity infrastructure so that the identity infrastructure can use public key certificate verification techniques when the target device is activated. The unique identifier serial number may also be programmed into an RFID tag inside or attached to the unit which can be read during manufacture or during enrollment.

In addition if desired, the root public key of the authorization infrastructure (the infrastructure that employs the security management device) may be signed by the identity infrastructure if it is a PKI infrastructure for example, so that it will be trusted for validation of other unit's capabilities or permissions during the configuration process or during operation. Once the authorization root public key has been installed, the identity root public key may only get used for reassignment of the unit to other network operators.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for enrolling a plurality of target devices in a network comprising:
   obtaining, by an in situ enrollment device that is not enrolled as an in situ device, in situ enrollment information from at least one of the target devices;
   securely providing, by the in situ enrollment device, the in situ enrollment information from the at least one target device to a security management device for the network that allows target device configuration certificate generation by the security management device for the at least one target device based on the provided in situ enrollment information;
   wherein the in situ enrollment information provided by the in situ enrollment device comprises a device identifier for the target device and context information of the target device; and wherein the at least one processor creates a record for the target device for a management database based on the obtained in situ enrollment information and wherein securely providing the in situ enrollment information comprises digitally signing the record using a signing key trusted by the security management device to create a secure enrollment record and providing the secure enrollment record to the security management device.

2. The method of claim 1 comprising generating, by the security management device, the target device configuration certificate for the target device based on the in situ enrollment information using an asymmetric key based signature.

3. The method of claim 2 comprising:
   receiving a request from the target device for the generated target device configuration certificate;
   retrieving the generated target device configuration certificate; and
   returning the retrieved target device configuration certificate to the target device.

4. The method of claim 1 comprising authenticating an identity of target device as a member of a network of devices in the network using an asymmetric key certificate associated with the target device.

5. The method of claim 1 wherein securely providing, by the enrollment device, the in situ enrollment information comprises providing context information of the target device that indicates at least one of: the target device's location within a system layout and position of the target device within the system topology.

6. The method of claim 1 wherein securely providing, by the enrollment device, the in situ enrollment information comprises providing geographical location of the target device.

7. An in situ enrollment device comprising:
   at least one processor operative to enroll a target device in a network using a security management device by obtaining, in situ enrollment information from the target device; and securely providing the in situ enrollment information obtained from the at least one target device to the security management device that allows target device configuration certificate generation by the security management device for the at least one target device based on the provided in situ enrollment information; and
   wherein the at least one processor is operative to create a record for the target device in a management database based on the obtained in situ enrollment information and wherein securely providing the in situ enrollment information comprises digitally signing the record using a signing key trusted by the security management device to create a secure enrollment record and providing the secure enrollment record to the security management device.

8. The device of claim 7 wherein the at least one processor is operative to provide the in situ enrollment information from the at least one target device to the security management device by securely providing a device identifier for the target device; provide geographical location of the target device and provide context information of the target device to the security management device.

9. A system comprising:
   a plurality of target devices;
   a security management device;
   an in situ enrollment device that is not enrolled as an in situ device, operatively coupled to the security management device and comprising logic operative to enroll the plurality of target devices in a network using the security management device by obtaining, in situ enrollment information from each of the plurality of target devices; and securely providing the in situ enrollment information obtained from each of the plurality of target devices to the security management device;
   the security management device operative to generate a target device configuration certificate for each of the plurality of target devices based on the in situ enrollment information from each of the target devices using an asymmetric key based signature; and
   wherein the at least one processor is operative to create a record for a target device in a management database based on the obtained in situ enrollment information and wherein securely providing the in situ enrollment information comprises digitally signing the record using a signing key trusted by the security management device to create a secure enrollment record and providing the secure enrollment record to the security management device.

10. The system of claim 9 wherein the security management device is operative to:
    receive a request from the target device for the generated target device configuration certificate;

retrieve the generated target device configuration certificate; and return the retrieved target device configuration certificate to the target device.

\* \* \* \* \*